US008381002B2

(12) United States Patent
Nayar et al.

(10) Patent No.: US 8,381,002 B2
(45) Date of Patent: Feb. 19, 2013

(54) TRANSPARENTLY INCREASING POWER SAVINGS IN A POWER MANAGEMENT ENVIRONMENT

(75) Inventors: Naresh Nayar, Rochester, MN (US); Karthick Rajamani, Austin, TX (US); Freeman L. Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 12/821,789

(22) Filed: Jun. 23, 2010

(65) Prior Publication Data

US 2011/0320840 A1 Dec. 29, 2011

(51) Int. Cl.
G06F 1/32 (2006.01)
(52) U.S. Cl. ........................................ 713/320; 713/300
(58) Field of Classification Search .................. 713/300, 713/320, 323, 324; 718/104, 105
See application file for complete search history.

(56) References Cited

U.S. PATENT DOCUMENTS

| 7,076,682 | B2 | 7/2006 | Jacobson |
| 7,194,641 | B2 | 3/2007 | Hack |
| 7,194,645 | B2 | 3/2007 | Bieswanger et al. |
| 7,334,142 | B2 | 2/2008 | Hack |
| 7,388,839 | B2 | 6/2008 | Chafle et al. |
| 7,444,526 | B2 | 10/2008 | Felter et al. |
| 7,448,037 | B2 | 11/2008 | Arimilli et al. |
| 7,484,110 | B2 | 1/2009 | Stufflebeam |
| 7,493,478 | B2 | 2/2009 | Arimilli et al. |
| 7,530,071 | B2 | 5/2009 | Billau et al. |
| 7,730,248 | B2 | 6/2010 | Goss et al. |
| 2007/0094525 | A1 | 4/2007 | Uguen et al. |
| 2008/0091964 | A1* | 4/2008 | Hack .............................. 713/322 |
| 2008/0104587 | A1 | 5/2008 | Magenheimer et al. |
| 2008/0301473 | A1 | 12/2008 | Perez et al. |
| 2009/0037712 | A1 | 2/2009 | Mallik et al. |
| 2009/0049314 | A1 | 2/2009 | Taha et al. |

(Continued)

FOREIGN PATENT DOCUMENTS

| CN | 101685335 A | 3/2010 |
| EP | 2 071 458 A1 | 6/2009 |

OTHER PUBLICATIONS

Suresh Siddha "Chip Multi Processing awareLinux Kernel Scheduler" Jul. 20-23, 2005 vol. two pp. 193-202.*

(Continued)

*Primary Examiner* — Kim Huynh
*Assistant Examiner* — Alyaa Mazyad
(74) *Attorney, Agent, or Firm* — Francis Lammes; Stephen J. Walder, Jr.; Libby Z. Toub

(57) ABSTRACT

A mechanism is provided for transparently consolidating resources of logical partitions. Responsive to the existence of the non-folded resource on an originating resource chip, the virtualization mechanism determines whether there is a destination resource chip to either exchange operations of the non-folded resource with a folded resource on the destination chip or migrate operations of the non-folded resource to a non-folded resource on the destination chip. Responsive to the existence of the folded resource on the destination resource chip, the virtualization mechanism transparently exchanges the operations of the non-folded resource from the originating resource chip to the folded resource on the destination resource chip, where the folded resource remains folded on the originating resource chip after the exchange. Responsive to the absence of another non-folded resource on the originating resource chip, the vitalization mechanism places the originating resource chip into a deeper power saving mode.

15 Claims, 6 Drawing Sheets

U.S. PATENT DOCUMENTS

| | | | |
|---|---|---|---|
| 2009/0089481 | A1 | 4/2009 | Kapoor et al. |
| 2009/0106571 | A1 | 4/2009 | Low et al. |
| 2009/0132840 | A1 | 5/2009 | Talwar et al. |
| 2009/0177903 | A1 | 7/2009 | Rozen et al. |
| 2009/0199019 | A1 | 8/2009 | Hongisto et al. |
| 2009/0282300 | A1 | 11/2009 | Heyrman et al. |
| 2009/0307713 | A1 | 12/2009 | Anderson et al. |
| 2010/0037038 | A1 | 2/2010 | Bieswanger et al. |
| 2010/0146513 | A1* | 6/2010 | Song .................. 718/104 |
| 2012/0096293 | A1 | 4/2012 | Floyd et al. |

OTHER PUBLICATIONS

USPTO U.S. Appl. No. 12/907,190.

Mahapatra, Rabi N. et al., "An Energy-Efficient Slack Distribution Technique for Multimode Distributed Real-Time Embedded Systems", IEEE Transactions on Parallel and Distributed Systems, vol. 16, No. 7, Jul. 2005, pp. 650-662.

Xue, Zhenghua et al., "An energy-efficient management mechanism for large-scale server clusters", IEEE Asia-Pacific Services Computing Conference, Dec. 11-14, 2007, pp. 509-516.

International Search Report and Written Opinion dated Sep. 30, 2011 for International Application No. PCT/EP2011/059425, 12 pages.

Chen, Xiaoxin et al., "Overshadow: A Virtualization-Based Approach to Retrofitting Protection in Commodity Operating Systems", ACM Digital Library, Mar. 2008, 12 pages.

Padala, Pradeep et al., "Adaptive Control of Virtualized Resources in Utility Computing Environments", ACM Digital Library, Mar. 2007, 14 pages.

Ueno, H et al., "Virtage: Hitachi's Virtualization Technology", INSPEC/IEEE; 2009, 1 page.

Wang, Yi et al., "Virtual Routers on the Move: Live Router Migration as a Network-Management Primitive", ACM Digital Library, Aug. 2008, pp. 231-242.

USPTO U.S. Appl. No. 13/457,030.

* cited by examiner

TRANSPARENTLY INCREASING POWER SAVINGS IN A POWER MANAGEMENT ENVIRONMENT

BACKGROUND

The present application relates generally to an improved data processing apparatus and method and more specifically to mechanisms for transparently increasing power savings in a power management environment.

There is an emerging customer requirement for better power and thermal management in server systems. Customers increasingly expect systems to behave in such a way as to be power-efficient. Customers also want the ability to set policies that trade off power and performance in order to meet their particular objectives. For example, customers want to be able to over-provision their installations relative to the nominal maximum power and temperature values of the systems that they install but be able to take advantage of the variability in workloads and utilization to ensure that the systems operate correctly and within the limits of the available power and cooling.

IBM®'s EneruScale™ controls the power and temperature of running systems in a performance-aware manner under the direction of a set of policies and objectives specified through EnergyScale™'s user interfaces. To do so, EnergyScale™'s implements detailed, periodic measurement of processor core power and temperature, measurement of the power consumed by the entire system board as well as any plugged-in processor cards and measurement of the memory power and temperature to the system. EnergyScale™ uses the results of these measurements to adjust the system's operation and configuration to meet specified objectives for power, temperature, and performance by using closed-loop feedback control operating in real time.

One of the tools used by EnergyScale™ to control power is to adjust the frequency and voltage of the processor chips and cores in the system to control the power dissipation as a function of the user specified energy scale policy. Early EnergyScale™ designs required that the voltage and frequency of all central processing units (CPUs) in the system maintained at the same value. As the EnergyScale™ design and implementation became more sophisticated, it became possible to have cores in a system running at different frequencies and voltages and allowed the implementation of more sophisticated power savings algorithms.

SUMMARY

In one illustrative embodiment, a method, in a data processing system, is provided for transparently consolidating resources of logical partitions. The illustrative embodiment determines whether there is a non-folded resource on an originating resource chip in a set of resource chips. In the illustrative embodiment, the non-folded resource is associated with a logical partition that has entered a power saving mode in a set of logical partitions. The illustrative embodiment determines whether there is a destination resource chip to either exchange operations of the non-folded resource with a folded resource on the destination chip or migrate operations of the non-folded resource to a non-folded resource on the destination chip in response to the existence of the non-folded resource on the originating resource chip. The illustrative embodiment transparently exchanges the operations of the non-folded resource from the originating resource chip to the folded resource on the destination resource chip, wherein the folded resource remains folded on the originating resource chip after the exchange in response to the existence of the folded resource on the destination resource chip. The illustrative embodiment determines whether there is another non-folded resource on the originating resource chip. The illustrative embodiment places the originating resource chip into a deeper power saving mode, wherein the deeper power saving mode saves additional power as compared to the cumulative power savings of all resources in the plurality of resources on the destination resource being in a individual power saving mode in response to the absence of another non-folded resource on the originating resource chip.

In other illustrative embodiments, a computer program product comprising a computer useable or readable medium having a computer readable program is provided. The computer readable program, when executed on a computing device, causes the computing device to perform various ones, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

A side-effect of the more sophisticated EnergyScale ™ implementation is that energy savings opportunities increase with the increasing granularity of energy scale algorithm, For example, greater energy may be saved if all cores of a processor chip are turned off versus the same number of cores being turned off on two different processor chips. In other words, the greatest energy savings opportunities arise when the system resources are packed, for example, the processor cores and memory for the logical partitions are allocated to the smallest number of processor and memory chips in the system.

The illustrative embodiments provide a mechanism for transparently consolidating resources of logical partitions that are in static power saving mode. Through processor and memory virtualization technologies, a virtualization mechanism may exchange one or more allocated non-folded virtual processors and/or memory of idle logical partitions transparently with other allocated virtual processors and/or memory on fewer active processor and memory chips or migrate one or more allocated non-folded virtual processors and/or memory of idle logical partitions to unallocated portions of the fewer active processor and memory chips. Transparent means that the operating system running in the logical partition is not aware that its allocated processor cores and logical memory blocks have has their operations exchanged or migrated by the virtualization mechanism. The purpose of the exchange or migration of operations is to pack active processor cores and logical memory blocks of active logical partitions in static power saving mode onto as few processor and memory chips as possible. With the active processor cores and logical memory blocks packed onto fewer active processor and memory chips, the initial processor cores and logical memory blocks may then be folded and those resources corresponding to the folded resources may be placed into a highest energy scale saving mode. The key point is that the virtualization mechanism has active processors and memory consolidated onto fewer processor and memory chips. The processor and memory chips that have consolidated resources are expending more power than they were before the consolidation, but the other processor and memory chips that correspond to the folded resources may now be placed into deeper power saving mode, so the net effect is that additional power is saved using the consolidation techniques.

Figure 1:
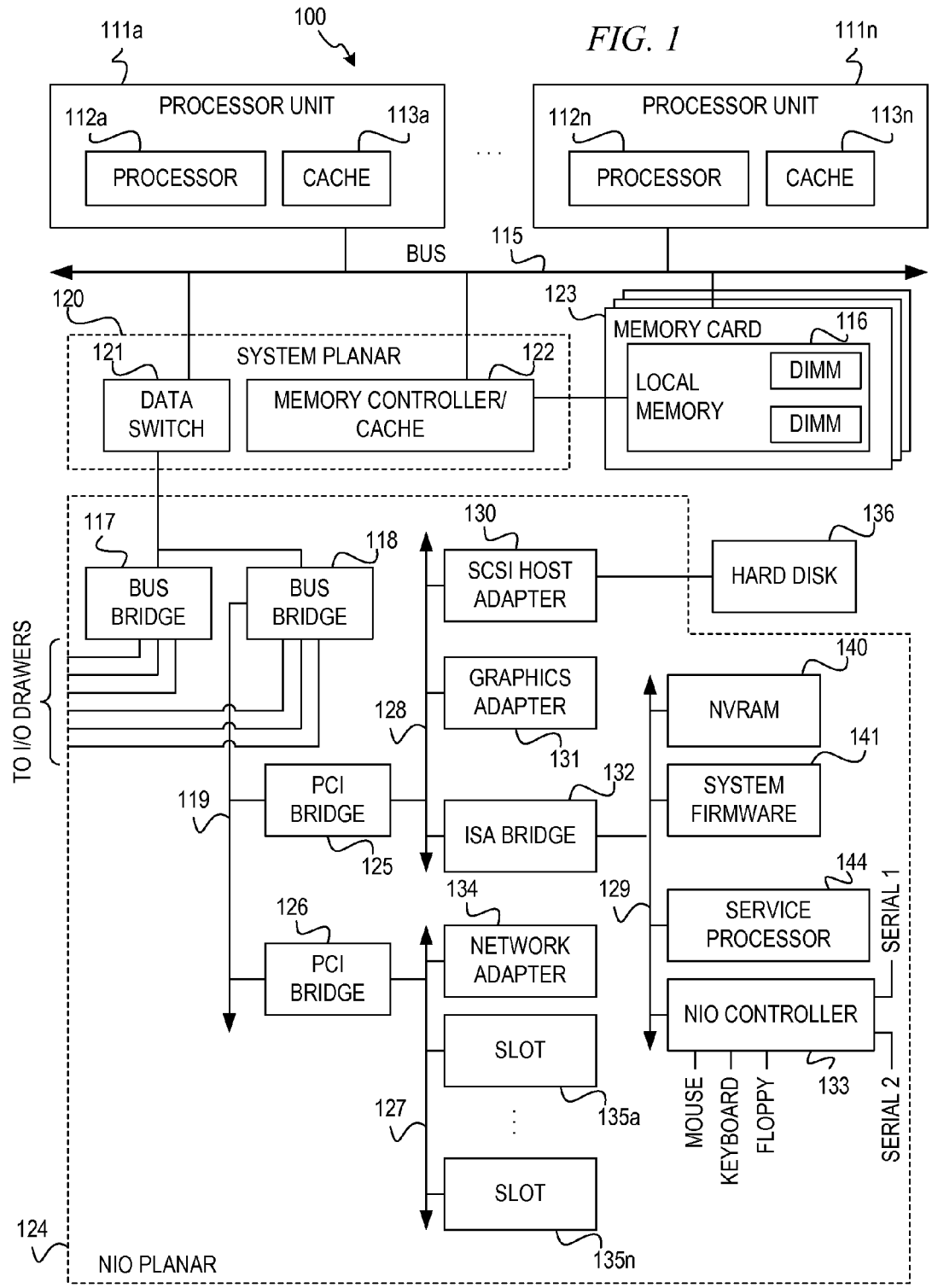
FIG. 1 depicts a block diagram of a data processing system with which aspects of the illustrative embodiments may advantageously be utilized.
Figure 2:
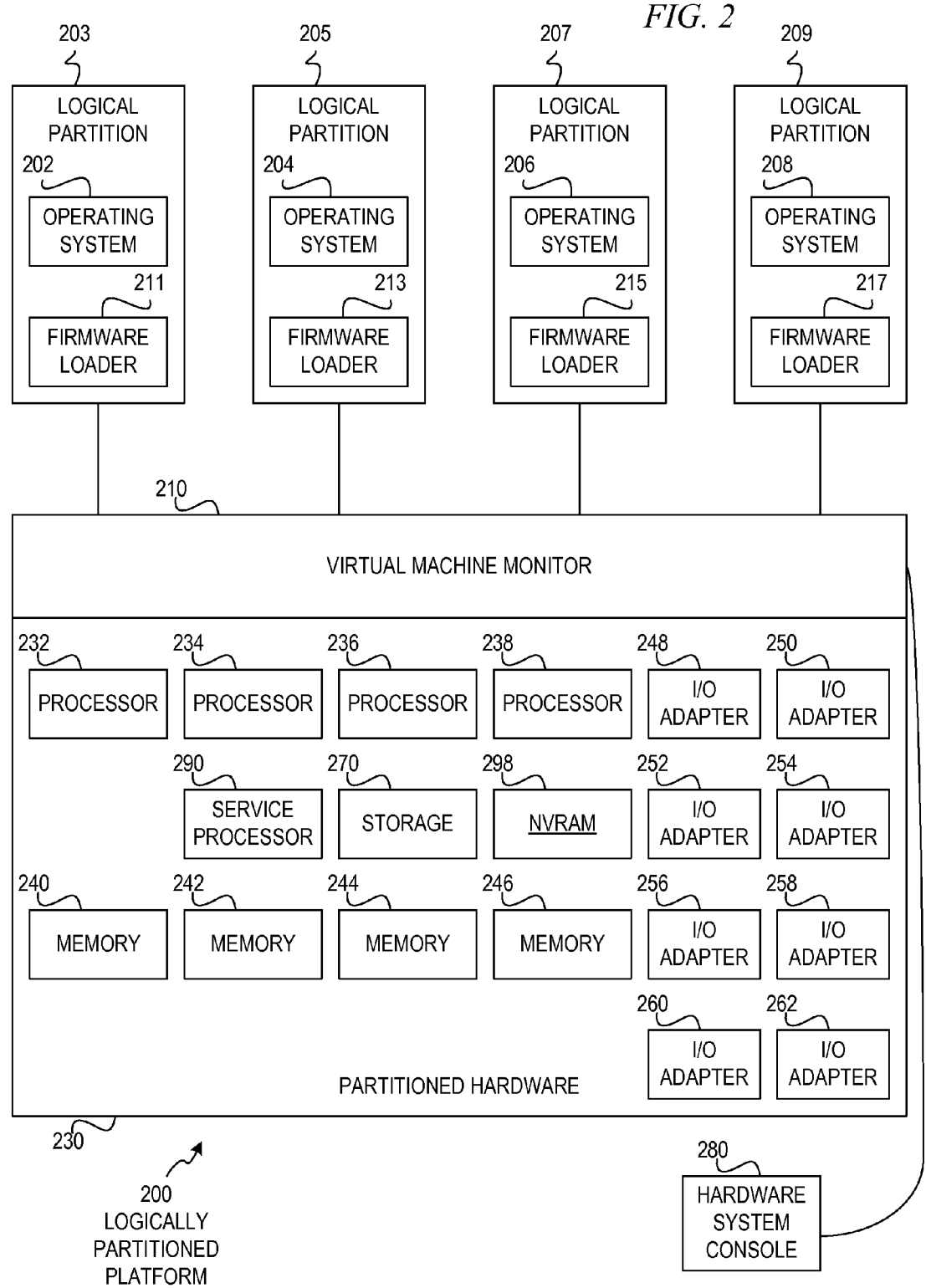
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that transparently consolidates resources of logical partitions that are in static power saving mode onto as few as processor and memory chips as possible, this is only an example and is not intended to state or imply any limitation with regard to the features of the present invention. To the contrary, the illustrative embodiments are intended to include distributed data processing environments and embodiments in which resources of logical partitions that are in static power saving mode may be transparently consolidated onto as few as processor and memory chips as possible.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software, The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111*a*-111*n*. Each of processor units 111*a*-111*n* includes a processor and a cache memory. For example, processor unit 111*a* contains processor 112*a* and cache memory 113*a*, and processor unit 111*n* contains processor 112*n* and cache memory 113*n*.

Processor units 111*a*-111*n* are connected to main bus 115. Main bus 115 supports system planar 120 that contains processor units 111*a*-111*n* and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native 110 (MO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135*a*-135*n* via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial Basic Input/Output System (BIOS) functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used. to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware, e.g., a hypervisor. OS1400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform. (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logically partitioned platform 200 may also make use of IBM®'s PowerVM™ Active Memory™ Sharing (AMS), which is an IBM® PowerVM™ advanced memory virtualization technology that provides system memory virtualization capabilities to IBM Power Systems, allowing multiple logical partitions to share a common pool of physical memory. The physical memory of IBM Power Systems® may be assigned to multiple logical partitions either in a dedicated or shared mode. A system administrator has the capability to assign some physical memory to a logical partition and some physical memory to a pool that is shared by other logical partitions. A single partition may have either dedicated or shared memory. Active Memoryl™ Sharing may be exploited to increase memory utilization on the system either by decreasing the system memory requirement or by allowing the creation of additional logical partitions on an existing system.

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, without departing from the spirit and scope of the present invention.

On a logically partitioned system such as logically partitioned platform 200 of FIG. 2, the allocation of processor and memory resources is highly dependent on the partition configuration. In general, multiple partitions have processor and memory resources allocated from a single processor chip (cores on the processor chip and the memory behind the memory controllers on the chip). It is also possible that a partition may have resources allocated from multiple chips in the system. In general, the processor and memory allocation policies are geared towards optimal system performance. The processor and memory resources are allocated so that there is good affinity between a partition's processors and memory. However, these allocation policies may conflict with the EnergyScale™ savings policy of packing processor and memory resources to save power.

When a set of logical partitions on a system are in a power saving mode, such as static power save where the customer desire is to save as much as power as possible for the given set of logical partitions, logical partitions will fold memory and processors in response to the static power saving mode. Processor folding is a technique used by an operating system to steer work away from one or more of its allocated processors. That is, as the processor utilization of a logical partition decreases below a threshold, the operating system will fold an allocated processor such that no work is dispatched and no interrupts are directed to the folded processor. Folding/unfolding decisions are evaluated by the operating system on a time-scale of seconds. Processor folding in micro-partitions helps with the performance of the shared processor pool by reducing dispatching. Processor folding in dedicated processor partitions helps with power savings and/or improved temporary allocation to the shared processor pool. Memory folding is a technique used by an operating system to steer memory allocation away from one or more of its logical memory blocks. As the memory utilization of a logical partition decreases below a threshold, the operating system will fold memory. Memory folding in a dedicated memory partition also helps with power savings. Similarly, for shared memory pool, the virtualization mechanism hypervisor may fold memory when the utilization of the pool falls below a certain threshold.

On an implementation such as IBM's POWER7 Systems™, a folded virtual processor from a logical partition's viewpoint corresponds to "sleep" mode of the central processing unit. Similarly the folded memory of the logical partition may be in self-time refresh (a deep memory power saving mode) if a big enough chunk of contiguous memory has been folded. However, a logical partition always has some processors that are not folded and some amount of memory that is not folded. The number of processors and the amount of processors that are folded by a logical partition are a function of the workload in the logical partition. However, even an idle logical partition will not fold away its last virtual processor and all of its memory because it has to be responsive to external or timer interrupts that may generate work for the logical partition. Since there could be tens to hundreds of logical partitions on the system that are in static power saving mode, and multiple logical partitions have the resources allocated in every chip in the system, the opportunity of using deeper energy scale modes for the hardware (sleep for cores and self-time refresh for memory) are limited by the fact that every logical partition has active processors and memory and, typically, multiple logical partitions have resources allocated from a chip.

Figure 3:
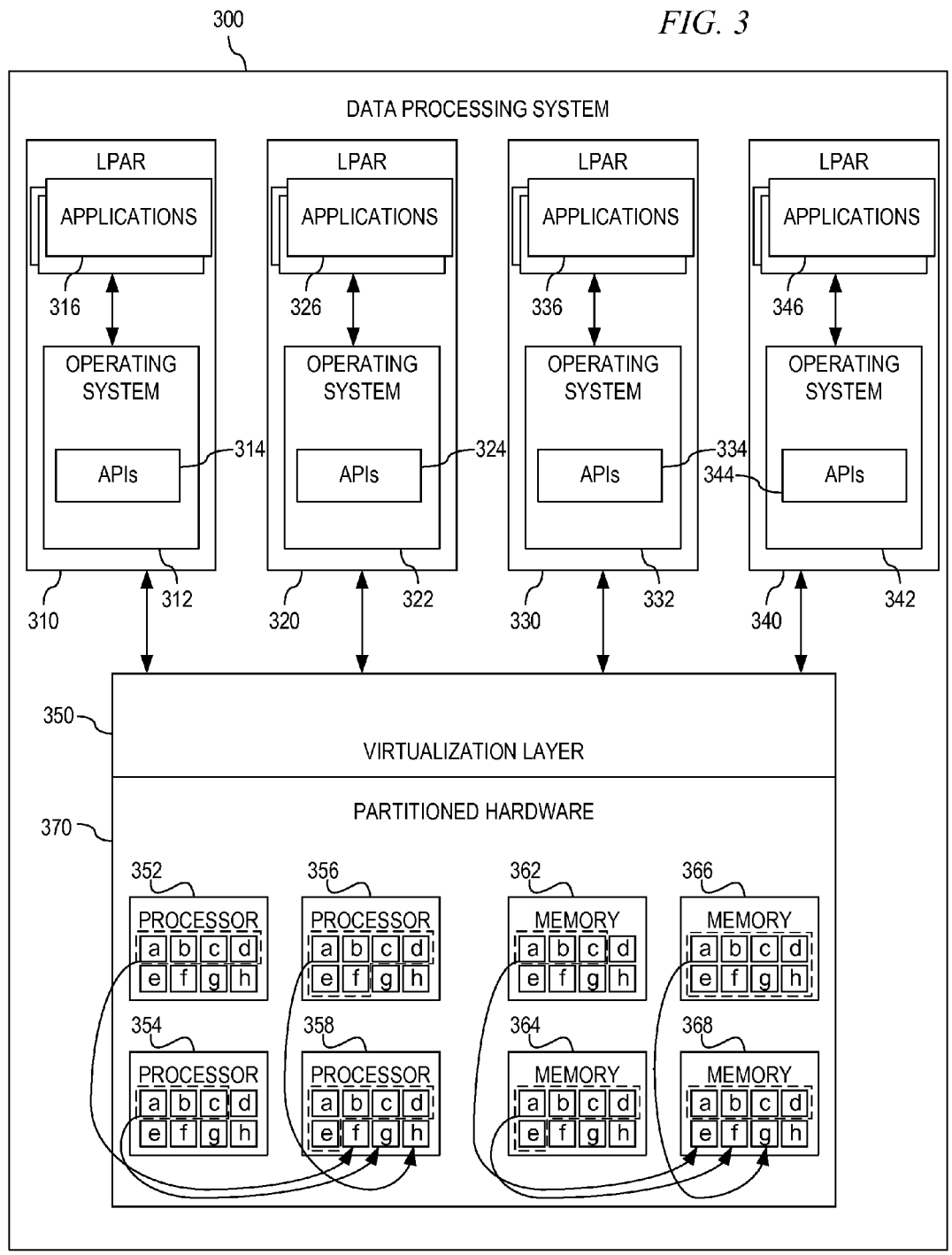
FIG. 3 depicts an exemplary block diagram illustrating a data processing system with a virtualized environment in accordance with an illustrative embodiment.

FIG. 3 depicts an exemplary block diagram illustrating a data processing system with a virtualized environment in accordance with an illustrative embodiment. Logically partitioned data processing system 300 has a plurality of logical partitions (LPARs) 310, 320, 330 and 340, which may also be referred to as clients or initiators. LPAR 310 has an instance of an operating system (OS) 312 with a set of application programming interfaces (APIs) 314 and one or more applications 316 running. LPAR 320 has OS 322 with APIs 324 and one or more applications 326. LPAR 330 has OS 332 with APIs 334 and one or more applications 336. LPAR 340 has OS 342 with APIs 344 and one or more applications 346. While logically partitioned data processing system 300 illustrates only LPARs 310, 320, 330, and 340, the illustrative embodiments are not limited to such. Rather, any number of LPARs may be utilized with the mechanisms of the illustrative embodiments without departing from the spirit and scope of the present invention.

LPARs 310, 320, 330, and 340 may communicate with one another through virtualization mechanism 350. Virtualization mechanism 350 may be software that performs communications and resource management to allow multiple instances of OSs 312, 322, 332, and 342 to run on logically partitioned data processing system 300 at the same time. Virtualization mechanism 350 performs tasks such as processor time slice sharing, memory allocation, or the like. Virtualization mechanism 350 may be, for example, a hypervisor or a virtual machine monitor, such as virtual machine monitor 210 of FIG. 2.

In this example, logically partitioned platform 300 may comprise LPARs 310, 320, 330, and 340 as well as processors 352, 354, 356, and 358 and memory 362, 364, 366, and 368 within partitioned hardware 370 under control of virtualization mechanism 350. Each of processors 352, 354, 356, and 358 may further comprise two or more processor cores. In this example, each of processors 352, 354, 356, and 358 comprise eight processor cores 352a-352h, 354a-354h, 356a-356h, and 358a-358h, respectively. Additionally, although memory allocation is rarely contiguous, in order to simplify the current example, memory 362, 364, 366, and 368 is illustrated to comprise logical memory blocks 362a-362h, 364a-364h, 366a-356h, and 368a-368h, respectively. When a logical partition is created, virtualization mechanism 350 allocates a portion of processors 352, 354, 356, and 358 and a portion of memory 362, 364, 366, and 368, as well as other resources to the logical partition.

For example, during the creation of LPAR 310, virtualization mechanism 350 allocates processor cores 352a-352d and logical memory blocks 362a-362c to LPAR 310. During the creation of LPAR 320, virtualization mechanism 350 allocates processor cores 354a-354c and logical memory blocks 364a-364e to LPAR 320. During the creation of LPAR 330, virtualization mechanism 350 allocates processor cores 356a-356f and logical memory blocks 366a-366h to LPAR 330. Finally, during the creation of LPAR 340, virtualization mechanism 350 allocates processor cores 358a-358e and logical memory blocks 362a-362d to LPAR 340. Although the exemplary allocations show various processor core and one logical memory block allocations to each logical partition, one of ordinary skill in the art will recognize that any number of processor cores and logical memory blocks may be allocated to a logical partition up to the capacity of resources available in the logically partitioned data processing system. Further, while normal allocation of processors and memory would not be as simplified as illustrated, this example is provided for ease of illustration to one of ordinary skill in the art.

In order for virtualization mechanism 350 to transparently consolidate resources, such as processor cores and logical memory blocks, of the logical partitions in static power saving mode onto as few processor and memory chips as possible, virtualization mechanism 350 monitors each of the resources in partitioned hardware 370. As work decreases and one or more of LPARs 310, 320, 330, and 340 become idle and are slotted for static power saving mode, operating systems 312, 322, 332, and 342 may respectively steer work away from one or more of their own allocated processor cores. Using processor cores as an example, as processor utilization decreases below a threshold for a set of allocated processor cores, the operating system may fold one or more of the allocated processor cores such that no additional work is sent to particular processor cores, those processor cores finish any currently allocated work and, once complete, the operating system may fold those processor cores and place the processor cores into a static power saving mode. The operating system may also perform a similar operation as the use of memory decreases so that logical memory blocks are folded and placed into a static power saving mode. The static power saving mode is such that a customer desires to save as much as power as possible for a given set of logical partitions while trading off some response time.

However, even in an idle state, each LPAR may leave one active non-folded processor core and some number of non-folded logical memory blocks. Thus, each of processors 352, 354, 356, and 358 and memory 362, 364, 366, and 368 are not able to enter the highest power saving mode possible. For example, if LPARs 310, 320, and 330 are idle and slotted for static power saving mode, operating systems 312, 322, and 332 may fold many of their processor cores and logical memory blocks and place those processor cores and logical memory blocks into a static power saving mode. However, operating systems 312, 322, and 332 may still leave processor cores 352a, 354a, and 356a, and logical memory blocks 362a, 364a, and 366a, respectively, in an active state. Virtualization mechanism 350 monitors each of LPARs 310, 320, 330, and 340 and partitioned hardware 370, such as processor cores 352a-352h, 354a-354h, 356a-356h, and 358a-358h and logical memory blocks 362a-362h, 364a-364h, 366a-356h, and 368a-368h. Virtualization mechanism 350 identifies the static power saving mode of LPAR 310, 320, and 330 and records the resource assignment of each of LPAR 310, 320, and 330.

If virtualization mechanism 350 determines that exchange or migration of operations of non-folded processor cores and logical memory blocks may save additional power, then virtualization mechanism 350 may transparently exchange operations of an allocated processor core with operation of an allocated but folded processor core on another one of processors 352, 354, 356, and 358 or migrate the operations of an allocated processor core to an unallocated processor core on another one of processors 352, 354, 356, and 358. For example, in the ease of an exchange, if LPAR 340 has folded one or more of allocated processor cores, such as a processor core 358d and 358e, virtualization mechanism 350 may exchange the operations of processor 358d with processor core 352a and exchange the operations of processor core 358e with the operations of 354a. Thus, virtualization mechanism 350 performs a transparent exchange of operations between processor cores and provides for a deeper power savings mode. As an example of the migration of operations, if processor cores 358f, 358g, and 358h are unallocated processor cores, then virtualization mechanism 350 may transparently migrate the operations of processor core 352a to processor core 358f, the operations of processor core 354a to processor core 358g, and the operations of processor core 356a to processor core 358h. Virtualization mechanism 350 then updates the assignments for the migrated processor cores of LPAR 310, 320, and 330, In logically partitioned system 300, virtualization mechanism 350 virtualizes all or parts of processors 352, 354, 356, and 358 to LPARs 310, 320, 330, and 340, for both dedicated and shared processor partitions. The virtualization of processors 352, 354, 356, and 358 allows virtualization mechanism 350 to exchange or migrate allocated portions of the processor operations from one processor chip to another processor chip. Virtualization mechanism 350 controls the state of virtual processor cores via a virtualization timer interrupt whereby the state of each virtual processor core is saved when a LPAR 310, 320, 330, and/or 340, enters a static power saving mode. Virtualization mechanism 350 may then restore the state of the virtual processor on an idle processor core when the static power saving mode is exited and the virtual processor resumes execution from the next processor instruction after the one that was executed prior to the saving of the state.

Virtualization mechanism 350 may also transparently exchange or migrate the operations of logical memory blocks 362a, 364a, and 366a to logical memory blocks 368e, 368f, and 368g, respectively. Virtualization mechanism 350 may exchange or migrate logical memory blocks by temporarily placing an associated virtual processor core of a logical partition into a mode where data storage and instruction storage interrupts are directed to virtualization mechanism 350. The mode, along with mechanisms to control the DMA writes of I/O devices, allows virtualization mechanism 350 to exchange or migrate memory transparently. Using transparent exchange or migration of operations, virtualization mechanism 350 does not inform operating systems 312, 322, and 332 of the exchange or migration of the respective processor cores and/or memory blocks operations. That is, since performance loss is acceptable in static power saving mode, the performance loss associated with not notifying the operating systems about affinity changes is acceptable. With processors 352, 354, and 356 offloaded of any active processor cores and memory 362, 364, and 366 offloaded of any active logical memory blocks, virtualization mechanism 350 may place processors 352, 354, and 356 as well as memory 362, 364, and 366 into a deeper energy scale mode, such as sleep mode for processors and self-time refresh for memory. In another embodiment, processor and memory consolidation may occur in other energy scale modes and virtualization mechanism 350 may notify an operation system of a logical partition to adjust affinity properties in such modes. Even further, since memory consolidation is time consuming, virtualization mechanism 350 may only perform processor consolidation depending on the requested energy scale mode.

The key point of this illustrative embodiment is that virtualization mechanism 350 has consolidated active processor cores and active logical memory blocks onto fewer processor and memory chips. While processor 358 and memory 368 that have the consolidated resources are expending more power than they were before the consolidation, processors 352, 354, and 356 as well as memory 362, 364, and 366 are in deep power saving modes that are saving much more power so that the net effect is that additional power is saved through the use of the consolidation techniques. The same consolidation technique may also be used for multi-node (multi-board) data processing systems. That is, if a sufficiently large number of logical partitions have folded processor cores and logical memory blocks, a supervisory virtualization mechanism may pack the processor cores and logical memory blocks onto the smallest number of nodes possible.

When a LPAR is taken out of static power saving mode, the operations of the resources of the logical partitions may be left at the current assignments or may be exchanged or migrated back to the original resource assignments. That is, when LPAR 310, 320, and 330 are slotted to come out of static power saving mode, virtualization mechanism 350 wakes processors 352, 354, and 356 as well as memory 362, 364, and 366. Virtualization mechanism 350 may then restore the original resource assignments by exchanging or migrating the operations of processor cores as well as exchanging or migrating the operations of logical memory blocks. Restoring the original assignments restores the correctness of the affinity strings and ensures that all of the performance outside of static power saving mode is restored.

In addition, if additional resources are allocated to a logical partition while the logical partition is static power saving mode, the affinity strings are reported as if the resources would have been allocated outside of static power saving mode. That is, virtualization mechanism 350 records the resource assignments and restores the resources when the logical partition exits the static power saving mode. This ensures that the performance associated with the new resource(s) is optimal when the logical partition exits static power saving mode.

Thus, the above technique performed by virtualization mechanism 350 transparently increases power savings in logically partitioned data processing system 300 in certain energy scale modes for the logical partitions without compromising the performance outside of the energy scale modes. Additionally, the above illustrated embodiments may be applied in any active memory sharing and micro-partition environment, where a virtualization mechanism provides folding and migration of operations, such as IBM®'s PowerVM™ Active Memory™ Sharing (AMS) system. Further, the above illustrated embodiments may be applied on a per-partition basis or a sub-set of partitions based on the energy scale mode enacted on those partitions.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
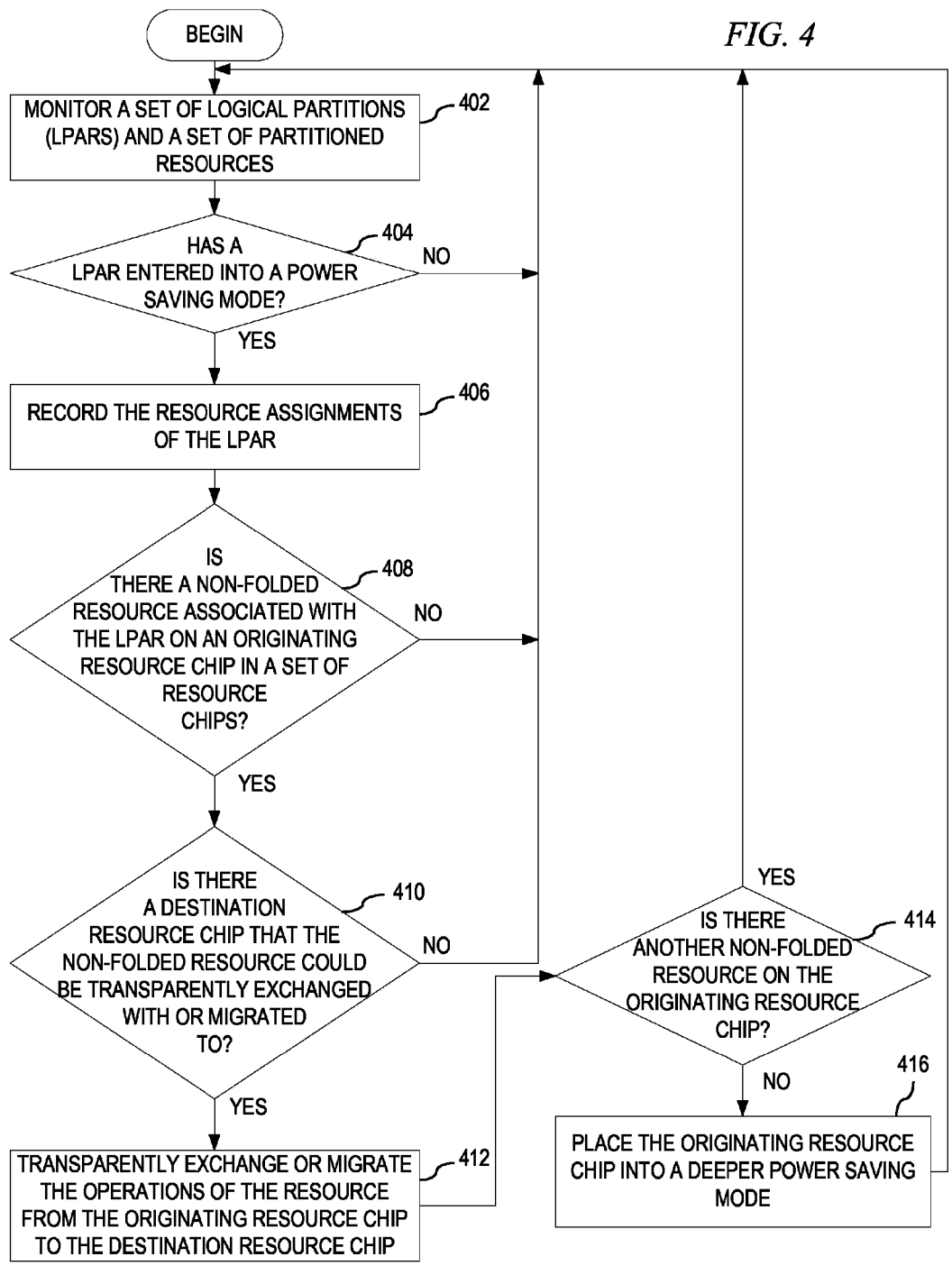
FIG. 4 depicts the operation performed by a virtualization mechanism to transparently consolidate resources of logical partitions that enter a power saving mode in accordance with a illustrative embodiment.
Figure 5:
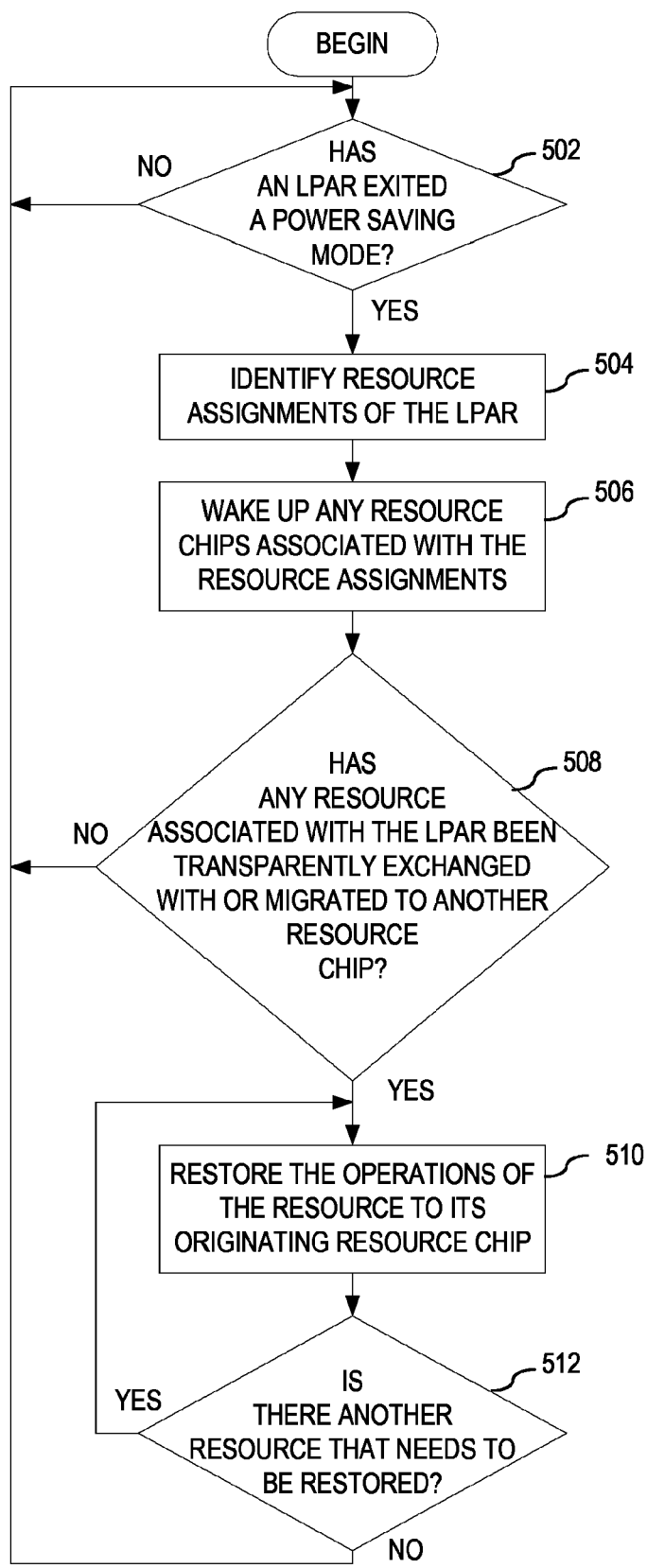
FIG. 5 depicts the operation performed by a virtualization mechanism to transparently consolidate resources of logical partitions that exit a power saving mode in accordance with a illustrative embodiment.
Figure 6:
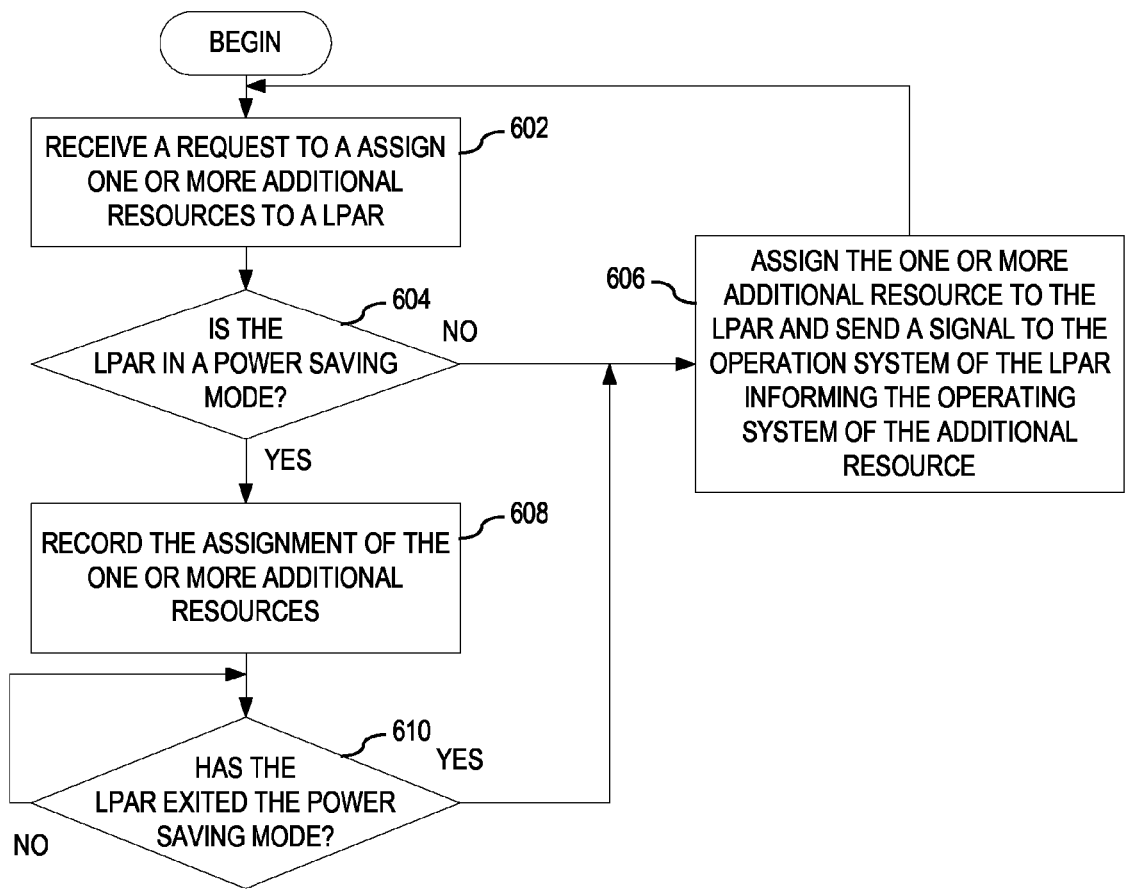
FIG. 6 depicts the operation performed by a virtualization mechanism o assign resources to a logical partition that is in a power saving mode in accordance with an illustrative embodiment.

Referring now to FIGS. 4-6, these figures provide flowcharts outlining example operations of transparently consolidating resources of logical partitions that are in a power saving mode. FIG. 4 depicts the operation performed by a virtualization mechanism to transparently consolidate resources of logical partitions that enter a power saving mode in accordance with a illustrative embodiment. The following description uses resource as a generic term to that of a more specific processor core, logical memory block, or the like, as the operation is the same for many types of resources as would be evident to one of ordinary skill in the art. As the operation begins, the virtualization mechanism monitors a set of logical partitions and a set of partitioned resources (step 402). During monitoring, the virtualization mechanism determines whether one or more of the set of logical partitions has entered into a power saving mode (step 404). if at step 404 the virtualization mechanism fails to identify a logical partition that has entered a power saving mode, then the operation returns to step 402. However, if at step 404 the virtualization mechanism determines that a logical partition is idle and has entered a power saving mode, the virtualization mechanism records the resource assignments of the logical partition (step 406).

The virtualization mechanism then determines whether there is a non-folded resource associated with the logical partition on an originating resource chip in a set of resource chips (step 408). If at step 408 the virtualization mechanism determined that there fails to be any non-folded resource, then the operation returns step 402. If at step 408 the virtualization mechanism determines that there is a non-folded resource, then the virtualization mechanism determines whether there is a destination resource chip that the operations of the non-folded resource could be transparently exchanged with or migrated to (step 410). If at step 410 the virtualization mechanism determines that there is not any destination resource chip that the operations of the non-folded resource could be exchanged with or migrated to, then the operation returns to step 402. If at step 410 the virtualization mechanism determines that there is a destination resource chip that the operations of the non-folded resource chip can exchange with or migrate to, then the virtualization mechanism transparently exchanges the operations of the resource from the originating resource chip with a folded resource on the destination resource chip where the exchange causes the folded resource to remain folded on the originating chip or migrates the operations of the resource from the originating resource chip to the destination resource chip, where the migration causes the resource on the originating chip to fold (step 412).

The virtualization mechanism then determines whether there is another non-folded resource on the originating resource chip (step 414). If at step 414 the virtualization mechanism determines that there is another non-folded resource on the originating resource chip, then the operation returns to step 402. If at step 414 the virtualization mechanism determines that there is not another non-folded resource on the originating resource chip, then the virtualization mechanism places the originating resource chip into a deeper power saving mode (step 416), with the operation returning to step 402 thereafter. The deeper power saving mode saves additional power as compared to the cumulative power savings of all resources in the plurality of resources on the destination resource being in a individual power saving mode.

FIG. 5 depicts the operation performed by a virtualization mechanism to transparently consolidate resources of logical partitions that exit a power saving mode in accordance with a illustrative embodiment. Again, the following description uses resource as a generic term to that of a more specific processor core, logical memory block, or the like, as the operation is the same for many types of resources as would be evident to one of ordinary skill in the art. As the operation begins, the virtualization mechanism determines whether a logical partition has exited a power saving mode (step 502). If at step 502 the virtualization mechanism determines that a logical partition has not exited a power saving mode, then the operation returns to step 502, If at step 502 the virtualization mechanism determines that the logical partition determines that a logical partition has exited a power saving mode, then the virtualization mechanism identifies the resource assignments of the logical partition (step 504). The virtualization mechanism then wakes up any resource chips associated with the resource assignments (step 506). The virtualization mechanism then determines whether any resource associated with the logical partition has had its operations transparently exchanged with or migrated to another resource chip (step 508). If at step 508 the virtualization mechanism determines that a resource has had its operations transparently exchanged with or migrated to another resource chip, the virtualization mechanism restores the resource to its originating resource chip (step 510). The virtualization mechanism then determines whether there is another resource that needs to be restored (step 512). If at step 512 the virtualization mechanism determines that there is another resource that needs to be restored, then the operation returns to step 510. If at step 512 the virtualization mechanism determines that there is not another resource that needs to be restored or if at step 508 the virtualization mechanism determines that no resource has had its operations transparently exchanged with or migrated to another resource chip, then the operation returns to step 502.

FIG. 6 depicts the operation performed by a virtualization mechanism to assign resources to a logical partition that is in a power saving mode in accordance with a illustrative embodiment. Again, the following description uses resource as a generic term to that of a more specific processor core, logical memory block, or the like, as the operation is the same for many types of resources as would be evident to one of ordinary skill in the art. As the operation begins, the virtualization mechanism receives a request to assign one or more additional resources to a logical partition (step 602). The virtualization mechanism determines whether the logical partition is in a power saving mode (step 604). If at step 604 the virtualization mechanism determines that the logical partition is not in a power saving mode, then the virtualization mechanism assigns the one or more additional resources to the logical partition and sends a signal to the operation system of the logical partition informing the operating system of the additional resources (step 606), with the operation returning to step 602 thereafter. If at step 604 the virtualization mechanism determines that the logical partition is in a power saving mode, then the virtualization mechanism records the assignment of the one or more additional resources in order to assign the one or more additional resources upon the logical partition exiting the power saving mode (step 608). The virtualization mechanism then determines if the logical partition has exited the power saving mode (step 610). If at step 610 the virtualization mechanism determines that the logical partition has not exited the power saving mode, then the operation returns to step 610. If at step 610 the virtualization mechanism determines that the logical partition has exited the power saving mode, then the operation proceeds to step 606.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for transparently consolidating resources of logical partitions that are in static power saving mode. Through processor and memory virtualization technologies, a virtualization mechanism may exchange operations with folded virtual processors and memory or migrate operations of non-folded virtual processors and memory of idle logical partitions transparently to fewer active processor and memory chips. With the active processor cores and logical memory blocks packed onto active processor and memory chips the initial processor cores and logical memory blocks may then he folded and those resources corresponding to the folded resources may be placed into a highest energy scale saving mode. The key point is that the virtualization mechanism has active processors and memory consolidated onto fewer processor and memory chips. The processor and memory chips that have consolidated resources are expending more power than they were before the consolidation, but the other processor and memory chips that correspond to the folded resources may now be placed into deeper power saving mode, so the net effect is that additional power is saved through the use of the consolidation techniques.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:

determine whether there is a non-folded resource on an originating resource chip in a set of resource chips, wherein the non-folded resource is associated with a logical partition that has entered a power saving mode in a set of logical partitions;

responsive to the existence of the non-folded resource on the originating resource chip, determine whether there is a destination resource chip to either exchange operations of the non-folded resource with a folded resource on the destination chip or migrate operations of the non-folded resource to a non-folded resource on the destination chip;

responsive to the existence of the folded resource on the destination resource chip, transparently exchange the operations of the non-folded resource from the originating resource chip to the folded resource on the destination resource chip, wherein the folded resource remains folded on the originating resource chip after the exchange;

determine whether there is another non-folded resource on the originating resource chip;

responsive to the absence of another non-folded resource on the originating resource chip, place the originating resource chip into a deeper power saving mode, wherein the deeper power saving mode saves additional power as compared to the cumulative power savings of all resources in the plurality of resources on the destination resource being in an individual power saving mode;

receive a request to assign one or more additional resources to the logical partition;

determine whether the logical partition is in the power saving mode; and responsive to the logical partition being in the power saving mode, record an assignment of the one or more additional resources in order to assign the one or more additional resources upon the logical partition exiting the power saving mode.

2. The computer program product of claim 1, wherein the computer readable program further causes the computing device to:

responsive to the existence of the non-folded resource on the destination resource chip, transparently migrate the operations of the non-folded resource from the originating resource chip to the non-folded resource on the destination resource chip, thereby causing the non-folded resource on the originating resource chip to fold;

determine whether there is another non-folded resource on the originating resource chip; and responsive to the absence of another non-folded resource on the originating resource chip, place the originating resource chip into a deeper power saving mode, wherein the deeper power saving mode saves additional power as compared to the cumulative power savings of all resources in the plurality of resources on the destination resource being in a individual power saving mode.

3. The computer program product of claim 1, wherein the resource is at least one of a processor core or a logical memory block, wherein, if the resource is the processor core, the originating resource chip and the destination resource chip are multi-core processors, and wherein, if the resource is the logical memory block, the originating resource chip and the destination resource chip are memory arrays.

4. The computer program product of claim 1, wherein the computer readable program further causes the computing device to:

record resource assignments of the logical partition prior to transparently exchanging or migrating the operations of the non-folded resource from the originating resource chip to either the folded resource or non-folded resource on the destination resource chip.

5. The computer program product of claim 1, wherein the computer readable program further causes the computing device to:
  determine whether the logical partition has exited the power saving mode;
  responsive to the logical partition exiting the power saving mode, assign the one or more additional resources to the logical partition; and
  send a signal to an operation system of the logical partition informing the operating system of the one or more additional resources.

6. An apparatus, comprising:
  a processor; and
  a memory coupled to the processor, wherein the memory comprises instructions which, when executed by the processor, cause the processor to:
  determine whether there is a non-folded resource on an originating resource chip in a set of resource chips, wherein the non-folded resource is associated with a logical partition that has entered a power saving mode in a set of logical partitions;
  responsive to the existence of the non-folded resource on the originating resource chip, determine whether there is a destination resource chip to either exchange operations of the non-folded resource with a folded resource on the destination chip or migrate operations of the non-folded resource to a non-folded resource on the destination chip;
  responsive to the existence of the folded resource on the destination resource chip, transparently exchange the operations of the non-folded resource from the originating resource chip to the folded resource on the destination resource chip, wherein the folded resource remains folded on the originating resource chip after the exchange;
  determine whether there is another non-folded resource on the originating resource chip;
  responsive to the absence of another non-folded resource on the originating resource chip, place the originating resource chip into a deeper power saving mode, wherein the deeper power saving mode saves additional power as compared to the cumulative power savings of all resources in the plurality of resources on the destination resource being in an individual power saving mode;
  receive a request to assign one or more additional resources to the logical partition;
  determine whether the logical partition is in the power saving mode; and
  responsive to the logical partition being in the power saving mode, record an assignment of the one or more additional resources in order to assign the one or more additional resources upon the logical partition exiting the power saving mode.

7. The apparatus of claim 6, wherein the instructions further cause the processor to:
  responsive to the existence of the non-folded resource on the destination resource chip, transparently migrate the operations of the non-folded resource from the originating resource chip to the non-folded resource on the destination resource chip, thereby causing the non-folded resource on the originating resource chip to fold;
  determine whether there is another non-folded resource on the originating resource chip; and
  responsive to the absence of another non-folded resource on the originating resource chip, place the originating resource chip into a deeper power saving mode, wherein the deeper power saving mode saves additional power as compared to the cumulative power savings of all resources in the plurality of resources on the destination resource being in a individual power saving mode.

8. The apparatus of claim 6, wherein the resource is at least one of a processor core or a logical memory block, wherein, if the resource is the processor core, the originating resource chip and the destination resource chip are multi-core processors, and wherein, if the resource is the logical memory block, the originating resource chip and the destination resource chip are memory arrays.

9. The apparatus of claim 6, wherein the instructions further cause the processor to:
  record resource assignments of the logical partition prior to transparently exchanging or migrating the operations of the non-folded resource from the originating resource chip to either the folded resource or non-folded resource on the destination resource chip.

10. The apparatus of claim 6, wherein the instructions further cause the processor to:
  determine whether the logical partition has exited the power saving mode;
  responsive to the logical partition exiting the power saving mode, assign the one or more additional resources to the logical partition; and
  send a signal to an operation system of the logical partition informing the operating system of the one or more additional resources.

11. A method, in a logically partitioned data processing system, for transparently consolidating resources of logical partitions, the method comprising:
  determining, by a virtualization mechanism in the logically partitioned data processing system, whether there is a non-folded resource on an originating resource chip in a set of resource chips, wherein the non-folded-resource is associate with logical partition that has entered a power saving mode in a set of logical partitions;
  responsive to the existence of the non-folded resource on the originating resource chip, determining, by the virtualization mechanism, whether there is a destination resource chip to either exchange operations of the non-folded resource with a folded resource on the destination chip or migrate operations of the non-folded resource to a non-folded resource on the destination chip;
  responsive to the existence of the folded resource on the destination resource chip, transparently exchanging, by the virtualization mechanism, the operations of the non-folded resource from the originating resource chip to the folded resource on the destination resource chip, wherein the folded resource remains folded on the originating resource chip after the exchange;
  determining, by the virtualization mechanism, whether there is another non-folded resource on the originating resource chip;
  responsive to the absence of another non-folded resource on the originating resource chip, placing, by the virtualization mechanism, the originating resource chip into a deeper power saving mode, wherein the deeper power saving mode saves additional power as compared to the cumulative power savings of all resources in the plurality of resources on the destination resource being in an individual power saving mode receiving, by the virtualization mechanism, a request to assign one or more additional resources to the logical partition;

determining, by the virtualization mechanism, whether the logical partition is in the power saving mode; and responsive to the logical partition being the power saving mode, recording, by the virtualization mechanism, an assignment of the one or more additional resources in order to assign the one or more additional resources upon the logical partition exiting the power saving mode.

12. The method of claim 11, further comprising:

responsive to the existence of the non-folded resource on the destination resource chip, transparently migrating, by the virtualization mechanism, the operations of the non-folded resource from the originating resource chip to the non-folded resource on the destination resource chip, thereby causing the non-folded resource on-the originating resource chip to fold;

determining, by the virtualization mechanism, whether there is another non-folded resource on the originating resource chip; and responsive to the absence of another non-folded resource on the originating resource chip, placing, by the virtualization mechanism, the originating resource chip into a deeper power saving mode, wherein the deeper power saving mode saves additional power as compared to the cumulative power savings of all resources in the plurality of resources on the destination, resource being ma individual power saving mode.

13. The method of claim 11, wherein the resource is at least one of a processor core or logical memory block, wherein, if the resource is the processor core, the originating resource chip and the destination resource chip are multi-core processors, and wherein, if the resource is the logical memory block, the originating resource chip and the destination-resource chip are memory arrays.

14. The method of claim 11, further comprising:

recording, by the virtualization mechanism, resource assignments of the logical partition prior to transparently exchanging or migrating the operations of the non-folded resource from the originating resource chip to either the bided resource or non-folded resource on the destination resource chip.

15. The method of claim 11, further comprising:

determining, by the virtualization mechanism, whether the logical partition has exited the power saving mode;

responsive to the logical partition exiting the power saving mode, assigning, by the virtualization mechanism, the one or more additional resources to the logical partition; and sending, by the virtualization mechanism, a signal to an operation system of the logical partition informing the operating system of the one Or more additional resources.

* * * * *